Sept. 7, 1965 K. R. BOWEN 3,204,840
SPARE TIRE ATTACHING AND MOUNTING DEVICE
Filed March 13, 1964
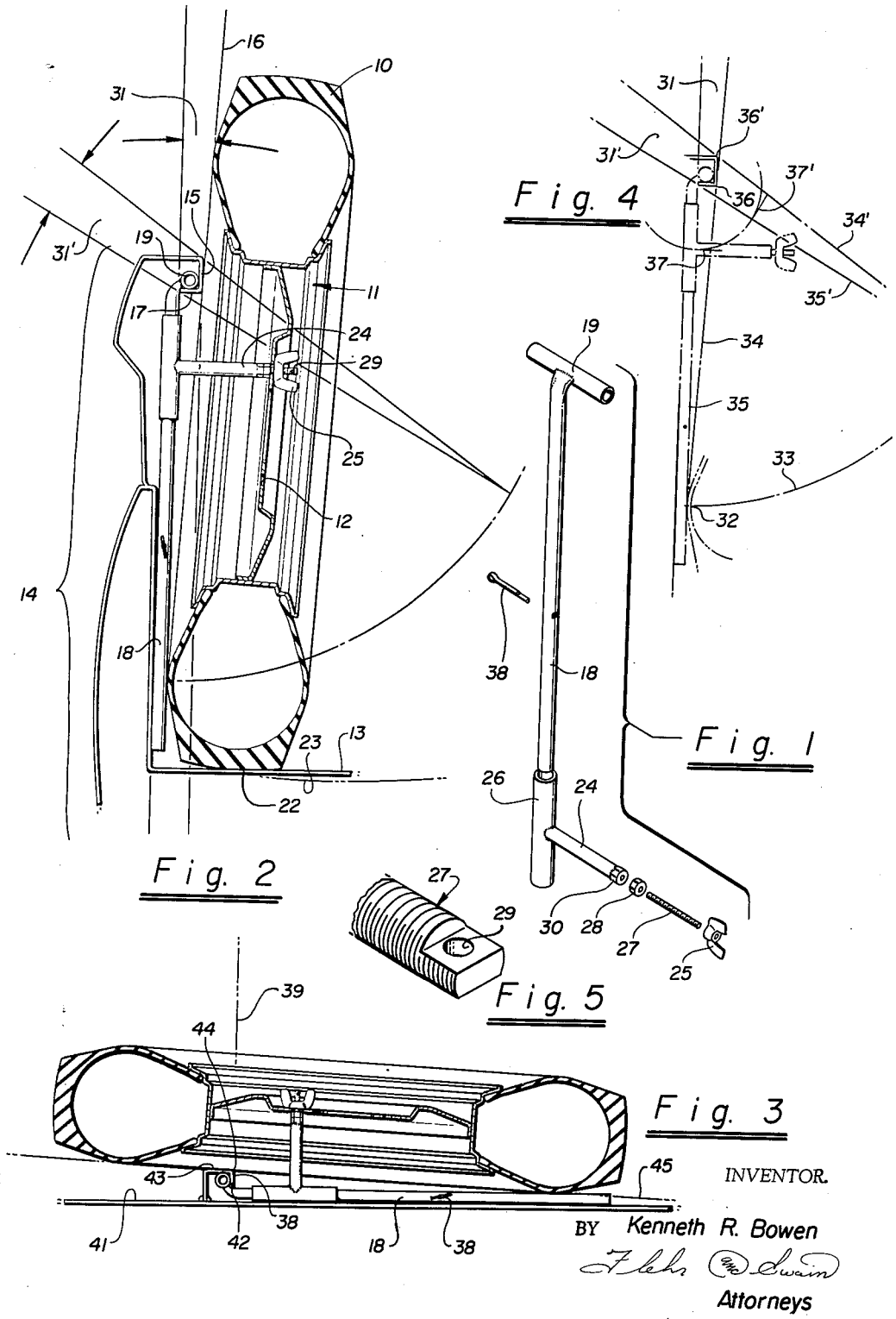
INVENTOR.
BY Kenneth R. Bowen
Attorneys

United States Patent Office 3,204,840
Patented Sept. 7, 1965

3,204,840
SPARE TIRE ATTACHING AND MOUNTING DEVICE
Kenneth R. Bowen, Rte. 1, Box 567, Red Bluff, Calif.
Filed Mar. 13, 1964, Ser. No. 351,741
9 Claims. (Cl. 224—42.24)

This invention relates to devices for holding spare tires firmly in place as carried in a vehicle, and more particularly pertains to a device of this kind quite useful in carrying the spare tire of a pickup truck.

The spare tire of many pickup trucks is frequently disposed beneath the bed of that body portion defining the cargo space or the "box" of the truck. Under some circumstances this can prove most inaccessible as where the loaded vehicle bogs down in soft ground.

In other instances the spare tire is carried within the load space of the truck, mounted upon a bracket or other fixture permanently secured to the vehicle. To employ such a fixture entails the expense of the fixture itself presently running on the order of $20 plus the additional cost of installation. Later, under circumstances which cannot be foreseen at the time of installation, the fixed location of the spare tire within the load space of the pickup truck also proves undesirable and inconvenient.

Thus when the truck is fully loaded it is most important to be able to readily remove the spare tire from its storage location in the event that it becomes necessary.

It is therefore a general object of the present invention to provide improved means for mounting a spare tire against a body portion of a vehicle.

It is another object of the invention to provide a spare tire holding means readily adaptable to a wide variation of spare tire constructions and particularly useful in supporting same within the load space of pickup trucks.

Still another object of the invention is to provide spare tire support means whereby the installation of permanent mounting brackets within the vehicle are rendered unnecessary and wherein the spare tire can be selectively located as desired at various positions against a body portion of the vehicle.

These and other objects of the invention will be more clearly apparent from the following detailed description of a preferred embodiment when considered in conjunction with the accompanying drawings in which:

FIGURE 1 shows a perspective exploded view according to the invention;

FIGURE 2 shows a spare tire holding device employed to attach a spare tire within the bed of a pickup truck;

FIGURE 3 shows a device according to the present invention employed in holding a spare tire horizontally;

FIGURE 4 is a diagram representing the functioning of the invention;

FIGURE 5 is an enlarged detailed view of the end of stud 27 as shown in FIGURES 1 and 2.

In a number of vehicles today, and as particularly found in pickup trucks, for example, the upper margin of the box of the truck is turned inwardly and then downwardly and finally directed outwardly of the load space to provide a generally horizontal lower ledge with an upstanding surface along the inner edge thereof.

As herein disclosed, a spare tire can be held against a body portion of a vehicle wherein there is found an L-shaped portion forming a lip and bearing surface, the lip being turned to project away from the side wall of the tire and the bearing surface lying alongside the tire.

In general, as described in detail further below, an attaching device for holding the tire snugly in place against the body portion employs an elongated staff. A head portion is carried at one end of the staff and adapted to engage the lip on one side thereof, with the staff being directed away from the other side. The staff further lies in a plane alongside the spare tire between the tire and the vehicle surface. Means are provided on the staff and disposed to extend toward the spare tire to protrude through and beyond an opening (such as a stud receiving hole) in the wheel thereof. Takeup means, for example a wing nut, coact with the foregoing means to draw the side wall of the spare tire tightly against the upwardly extending surface found at that edge of the lip adjacent the spare tire. At the lower end of the staff the side wall of the tire is drawn against the staff itself.

As shown in the drawing a spare tire is disposed in the load space of a pickup truck of a conventional design incorporating a ledge construction as above defined. The spare tire includes a pneumatic tire 10 mounted upon the usual wheel disc or wheel 11 of the vehicle. Wheel 11 includes a number of mounting stud holes 12. As such, the term "spare tire" will be understood to include the foregoing known construction.

The load space of the vehicle is defined by a floor or bed portion 13 running generally horizontal and an upstanding body portion generally designated numeral 14. Body portion 14 includes an upper margin which is bent inwardly toward the load space, then downwardly to form a bearing surface 15, and then turned to project outwardly away from the plane 16 of the side wall of tire 10, to produce a ledge 17.

A spare tire attaching device for holding the spare tire snugly in place against body portion 14 comprises an elongated staff 18. A head portion 19 is formed thereon in a T-shaped configuration and disposed to rest unattached against the upper surface of ledge 17. The staff 18, therefore, hangs downwardly from ledge 17. Staff 18 further lies alongside the spare tire with the lower end 21 terminating clear of the transverse supporting surface of bed 13. Staff 18 extends, however, sufficiently close to the supporting surface 13 to be engaged between the side of tire 10 and the inner surface of body portion 14 when the plane of the side wall of the tire is tilted at a sufficient angle to the supporting surface. The point of tire support 22 lies on an arc 23 curving downwardly and away from body portion 14 to intersect the supporting surface of bed 13. Arc 23 is struck by pivotal movement generally from head portion 19 of staff 18.

In order to hold the spare tire firmly in place, an elongated projection or rod 24 extends from staff 18 intermediate the ends thereof. Rod 24 serves to engage the wheel and therefore is threaded at its outer end whereby a wing nut can draw the wheel toward staff 18. Taking up the wing nut presses the spare tire against surface 15 at the upper end and against staff 18 below. Thus, in order for the spare tire to rock away from body portion 14 while pivoting about the bearing surface 15 it becomes necessary for the lowermost point of the spare tire to move along arc 23. Obviously this is not possible since arc 23 intersects surface 13. Accordingly, the spare tire remains firmly in place.

An additional retaining force of a camming nature about surface 15 is also developed to hold the spare tire in place as will be described and explained further below.

The transversely extending rod 24 is fixed to and forms a T-shaped connection with the sleeve 26. Sleeve 26 is slidably movable along and rotatable about staff 18. A threaded, telescopically extensible stud 27 is received within the threaded bore of rod 24 and, together with lock nut 28 and half nut 30 serves to permit rod 24 to be extended sufficiently, to a fixed extent, to protrude through a selected one of holes 12 without, however, protruding further into the load space. The outer end of stud 27 is formed with a pair of parallel spaced planar surfaces and a hole 29 drilled therethrough to receive a padlock or the like to prevent release of the spare tire.

Accordingly, stud 27 is screwed far enough into rod 24 whereby wing nut 25 can not be backed off more than a very limited distance, if at all, before engaging the shackle of a padlock carried in hole 29.

To retain sleeve 26 and rod 24 from slipping off the end of staff 18 when the device is not in use, a cotter key 20 or similar locking pin is inserted through holes drilled diametrically of staff 18.

An additional force, serving to resist rotation of the spare tire away from its upstanding disposition alongside the body portion is developed as best shown as diagrammed in the drawing. Staff 18 pivots generally from a point 32 whereby the point of contact between the lower end of staff 18 and the side wall of tire 10 moves in an arc 23.

It can be clearly seen that the angle 31 between the plane 34 of the side wall of tire 10 and a plane 35 along the adjacent side edge of staff 18 extending through pivot point 32 increases as the plane 34 of the side wall of the tire is tipped to the position and relationship identified by prime marks (') in the drawing. In so tipping plane 34 to line 34', the radius between pivot point 32 and the fulcrum 36 (defined by the point of contact between the side wall and bearing surface 15), is increased by moving to the position 36'. In short, tipping the plane of the side wall of the tire serves to elongate the radius extending between pivot 32 and fulcrum 36 and thereby increase the angle 31 formed between the plane of the side wall and the plane alongside the tire drawn through pivot 32 and the point of contact between staff 18 and the tire. It can be readily appreciated by observing the extension of line 37 lying axially along rod 24 and opposite angle 31 that if wing nut 25 is snugly fitted against wheel 11 the extension of line 37 to the degree shown at 37' will not be possible and thus the spare tire will remain firmly in place. Line 37, of course, represents the tangent of angle 31, if the adjacent side of the triangle is considered as unity.

To install a spare tire at any desired position along ledge 17, the head of staff 18 is disposed to hook the tubular portion 19 over ledge 17 to lie along same and pivot staff 18 downwardly therefrom. Sleeve 26 permits rod 24 to be moved to a heighth of any one of several studholes 12 and by rotation of sleeve 26 further serves to permit stud 27 to be manipulated through the selected hole. After applying wing nut 25, stud 27 can be screwed into rod 24 as desired. Locking nut 28 is moved against the half nut 30 on the end of rod 24 to fix the extent of stud 27 and the wing nut is then tightly taken up. Sleeve 26 serves to permit rod 24 to rotate to permit the plane 34 of the side wall to become aligned parallel to the axis of head portion 19 and flush with surface 15. Prior to tightening wing nut 25 sleeve 26 permits the spare tire to be slanted inwardly toward staff 18 at the lower end whereby the plane 34 of the side wall is tilted at an angle to the supporting surface. Thus, the point of support 22 is disposed on arc 23 at a point where it curves downwardly and away from the body portion so as to intersect surface 13.

While the above described device is primarily adapted to support a spare tire in an upstanding disposition, it is also suitable for other dispositions as well, due to the retentive leverage developed by the above explained camlike action developed upon surface 15.

Thus, the attaching device can be employed where a lip 38 is fixed to lie in a plane 39 outstanding from the plane 41 of a body portion alongside of which the spare tire lies (such as the horizontal floor of a trunk compartment). The edge 42 nearest the plane 41 terminates spaced therefrom to accommodate staff 18 therebetween.

In a horizontal disposition, th plane 45 of the side wall of the spare tire rests against a bearing surface 43 outstanding from the upper edge 44 of lip 38 whereby rocking movement of the tire about surface 43 is resisted by movement of the fulcrum from point F1 to F2. Sliding of the tire is restrained by frictional surface engagement developed by tightly clamping the wing nut.

From the foregoing it will be readily evident that there is provided a spare tire holder adapted to pivotally swing from any position where it is hung along ledge 17. Rubber contact is maintained throughout, and the spare tire holder is of extremely simple design to involve only a limited expense.

While the foregoing description and illustration represents a preferred embodiment of the construction it will be apparent to those skilled in the art that various changes and modifications thereof can be made without departing from the spirit and scope of the invention.

Therefore, what is claimed is:

1. For mounting a spare tire defined by a vehicle wheel with a tire thereon in a position alongside an upstanding body portion of a vehicle and resting on a transverse supporting surface wherein the body portion includes a lip turned to project away from the plane of the adjacent side wall of the tire, an attaching device for holding the spare tire snugly in place against the body portion, said device comprising an elongated staff, a head portion thereon disposed and formed to rest unattached against the upper surface of the lip and disposed the staff to depend downwardly therefrom alongside the spare tire, the lower end of said staff terminating clear of the transverse supporting surface and adapted to be engaged between the side of the spare tire and the body portion with the plane of the side wall of the tire tilted at an angle to the supporting surface, the point of support thereon being disposed on that portion of an arc struck generally from the head of the staff and curving downwardly and away from the body portion to intersect the supporting surface, and means extending from the staff intermediate the ends thereof to engage the wheel and draw same toward the staff to press the spare tire against the body portion above said means and the staff below said means.

2. For mounting a spare tire against a body portion of a vehicle wherein there is provided an L-shaped portion fixed to the body portion to form a lip and bearing surface, the lip being turned to project away from the plane of the adjacent side wall of the spare tire, the bearing surface lying alongside the spare tire, an attaching device for holding the tire snugly in place against the body portion comprising an elongated staff, a head portion at one end of the staff adapted to engage the lip on one side thereof and to direct the staff away from the other side, the staff lying in a plane alongside the spare tire between the tire and the body portion, elongate means carried by the staff and disposed to extend toward the spare tire to protrude through and beyond an opening in the wheel thereof, and take-up means coacting with the elongate means to draw the side wall of the spare tire tightly against the bearing surface at the head end of the staff and against the staff at the other end.

3. A spare tire mounting device for vehicles wherein there is provided a generally horizontal supporting ledge including a surface extending upwardly therefrom, said device comprising an elongated staff member adapted to lie alongside a spare tire, elongate means extending transversely of and carried by the staff member and adapted to protrude through an opening in the wheel of the spare tire, take-up means serving to draw the spare tire and staff member together, and means at the head of said staff member serving to hang said staff member pivotally and unattached from the supporting ledge with the first named surface being disposed between the head of the staff member and the side wall of the tire, the staff member extending sufficiently below the ledge to abut the spare tire.

4. For mounting a spare tire in the box of a pickup truck wherein there is provided a generally horizontal bed portion and a body portion upstanding therefrom, the upper margin of the body portion being turned inwardly of the box and then downwardly and outwardly to form an elongated ledge extending along the upper margin with a surface extending upwardly from the ledge along that edge thereof innermost of the load space, a readily detachable mounting device for carrying a spare tire defined by a vehicle wheel and tire mounted on same, said device comprising an elongated staff, means pivotally mounting said staff at the upper end thereof to hang from said ledge, means directed to extend away from the staff toward the spare tire to protrude through an opening in the wheel thereof, and means carried on the last named means serving to draw the spare tire toward the staff to press the tire against the upwardly extending surface at the inner edge of the ledge.

5. A mounting device as defined in claim 4 wherein said staff is pivotally mounted unattached at the upper end thereof to hang from said ledge.

6. A spare tire mounting device according to claim 4 wherein the penultimate named means is slidably movable along and rotatable about said staff to permit the plane of the side wall of the spare tire to be readily adjustable flush with the upwardly extending surface at the inner edge of said ledge, and wherein the penultimate named means is telescopically extensible to fix the extent thereof beyond the far side of the spare tire.

7. In combination, a vehicle construction having a cargo space defined by a generally horizontal bed portion and a side wall upstanding therefrom, the upper margin of the side wall being turned inwardly toward the cargo space and then directed downwardly a predetermined extent to form a bearing surface for receiving the side of a tire thereagainst, said margin being further bent outwardly of the cargo space to form an elongated ledge extending along the upper margin, and a readily detachable mounting device for carrying a spare tire, composed of a vehicle wheel and tire thereon, within the cargo spacer, said device comprising an elongated staff, means pivotally mounting said staff at the upper end thereof to hang downwardly from said ledge, means carried by and extending away from the staff toward the vehicle wheel to protrude through an opening therein, and means carried by the last named means serving to draw the spare tire toward the staff to press the tire against said bearing surface at the upper end of the staff and against the staff at the lower end of same.

8. Apparatus according to claim 7 wherein the first named means includes an elongated bar carried at the head of said staff member and forming a T-shaped configuration therewith, said bar being adapted to lie unattached along the ledge and support said staff therefrom.

9. Apparatus according to claim 7 wherein the penultimate named means extends away from the staff towards the vehicle wheel at a fixed angle to the staff.

References Cited by the Examiner

UNITED STATES PATENTS

| | | | |
|---|---|---|---|
| 2,701,670 | 2/55 | Hutchinson | 224—42.24 |
| 2,772,826 | 12/56 | Krengel | 224—42.24 |
| 2,831,622 | 4/58 | Bacca | 224—42.24 |

HUGO O. SCHULZ, *Primary Examiner.*